United States Patent [19]

Fry

[11] 4,223,913
[45] Sep. 23, 1980

[54] STEERABLE VEHICLES

[75] Inventor: Timothy S. Fry, Dunchurch, England

[73] Assignee: GKN Group Services Limited, Warley, England

[21] Appl. No.: 938,326

[22] Filed: Aug. 30, 1978

[30] Foreign Application Priority Data

Sep. 9, 1977 [GB] United Kingdom ............... 37646/77

[51] Int. Cl.³ .............................................. B62D 1/00
[52] U.S. Cl. .................................. 280/771; 180/24.01
[58] Field of Search ..................... 280/771; 180/24.01, 180/24.04, 45, 261, 262

[56] References Cited

U.S. PATENT DOCUMENTS

| 3,381,769 | 5/1968 | Reisser | 180/24.04 |
| 3,586,119 | 6/1971 | Chuchua | 180/45 |

*Primary Examiner*—John J. Love
*Assistant Examiner*—John A. Carroll
*Attorney, Agent, or Firm*—Merriam, Marshall & Bicknell

[57] ABSTRACT

A steerable vehicle has at least one rigid axle carrying steerable wheels, a steering box secured to the axle, and an input rotatable relative to the housing of the steering box with steering control means having first and second relatively rotatable parts, a connection between the first part of the steering control means and the housing of the box having a first element arranged to take up an average position between the first part and the housing during relative rotation therebetween, and a differential gearing between the second part of the control means and the input to the steering box, the differential gearing having a second element which takes up an average position between the second part and input during relative rotation, the first and second elements being connected for simultaneous movement. This prevents steering of the wheels due to relative roll occurring between the steering box and the control means.

7 Claims, 7 Drawing Figures

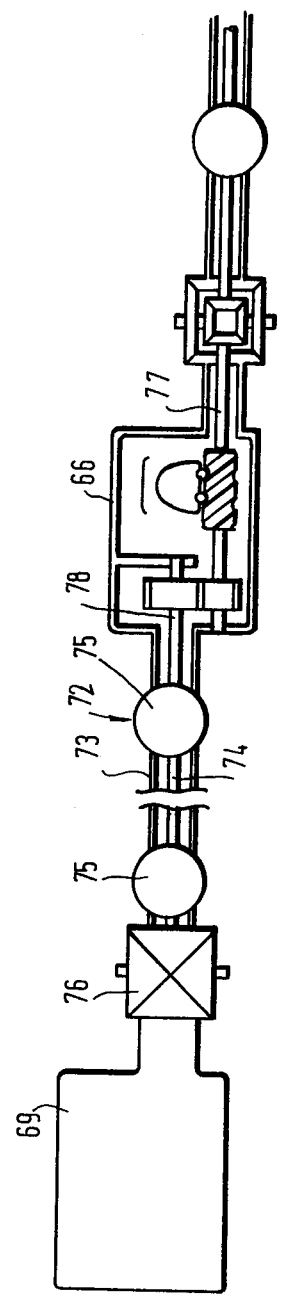

STEERABLE VEHICLES

BACKGROUND TO THE INVENTION

Field of the Invention

This invention relates to steerable vehicles including those having prime movers and those in the form of trailers or semi-trailers.

It would be convenient in a vehicle having a rigid axle carrying steerable wheels to mount the steering box on the axle and to connect the box by some type of linkage to a steering control means, e.g. a steering column, the linkage allowing for relative movement between the axle and the steering control means. The difficulty is that, in use, the axle pivots about axes extending generally fore and aft of the vehicle due to road conditions thus causing relative rotation or roll between the steering control means and the steering box and thus steering the wheels even though the driver has not given any input to the steering control means.

It is an object of the invention to provide steering means in which such relative rotation will affect the steering.

SUMMARY OF THE INVENTION

According to one aspect of the invention we provide a steerable vehicle comprising steering control means having first and second relatively rotatable parts; a rigid axle carrying steerable wheels; a steering box having a housing secured to the axle, an input and an output rotatable relative to the housing; means connecting said output to the steerable wheels; a connection between the first part of the steering control means and said housing and having a first element arranged to take up an average position between the first part and the housing during relative rotation therebetween; and a differential gearing between the second part of the steering control means and said input and having a second element which takes up an average position between said second part and said input during relative rotation therebetween, said first and second elements being connected for simultaneous movement.

If, for example, the first part of the steering control means is mounted on the vehicle chassis and there is relative rotation between the axle and the chassis due to roll under road conditions, the first element will take up an average position between said first part and the steering box housing. The second element will also take up an average position and, since there will have been no relative rotation between the first and second parts of the steering control means, the steering box output will have been moved by the second element taking up its average position to a position corresponding to that taken up by the axle and there will thus have been no relative movement between the steering box housing or axle and the steering box input. It follows, therefore, that relative rotational movement between the axle and the chassis during roll will not affect the steering. When steering is required, there will be relative movement between the first and second parts of the steering control means and thus relative rotation between the steering box input and the housing providing the desired output from the steering box.

The connection between the first part of the steering control means and the housing may be by way of a second differential gearing. Each gearing may be in the form of a bevel differential gearing with the planet gears forming said first and second elements and being carried on a common shaft. The bevel differential gearing could be replaced by epicyclic gearing of the spur gear type.

Alternatively, the first element may be provided by links capable of pivotal movement and between which the second element is carried. The use of such links is possible because the amplitude of the relative rotation between the first part of the steering control means and the housing is low.

Preferably the first and second parts of the steering control means are arranged coaxially with the second part within the first part. Each of said parts may comprise a number of portions connected by universal joints. The universal joints between the inner portions may be aligned with the universal joints between the outer portions.

The invention is applicable to a steerable vehicle having a number of steerable axles. A heavy vehicle may have two or more steerable axles and a trailer may, in some cases, have two or more steerable axles.

According to this aspect of the invention we provide a steerable vehicle comprising steering control means having first and second relatively rotatable parts; two or more rigid axles each carrying steerable wheels; a steering box for each axle, each steering box having a housing secured to the axle and an input and an output both rotatable relative to the housing; means connecting the output of each steering box to the steerable wheels of the axle on which said box is mounted; a first connection between the first part of the steering control means and the housing of one of said steering boxes and having a first element arranged to take up an average position between the first part and the housing during relative rotation therebetween; a first differential gearing between the second part of the steering control means and the input of said one steering box and having a second element which takes up an average position between said second part and said input during said relative rotation therebetween; said first and second elements being interconnected for simultaneous movement; a second connection between the housing of said one steering box and the housing of another of said steering boxes, said connection having a third element arranged to take up an average position between said steering boxes during relative rotation therebetween; and a second different gearing between the input of said one steering box and the input of said other steering box and having a fourth element which takes up an average position between said inputs during relative rotation therebetween, said third and fourth elements being interconnected for simultaneous movement.

In such an arrangement, steering will not be disturbed due to roll between the axles and the vehicle chassis or relative roll between the axles.

A vehicle having multiple steered axles requires that the wheels on one of the axles be turned through different angles than the wheels on other of the axles during cornering and suitable gearing for this purpose can be introduced into the means which connect the steering box of one of the axles to the steering box of the other. It will be appreciated that one may have more than two steering boxes and they will be connected as described.

BRIEF DESCRIPTION OF DRAWINGS

The invention will now be described in detail by way of example with reference to the accompanying drawings in which:

FIG. 7 is a view, partly in section, of the steering box interconnection of the arrangement of FIG. 6.

DESCRIPTION OF PREFERRED EMBODIMENTS

Figure 1:
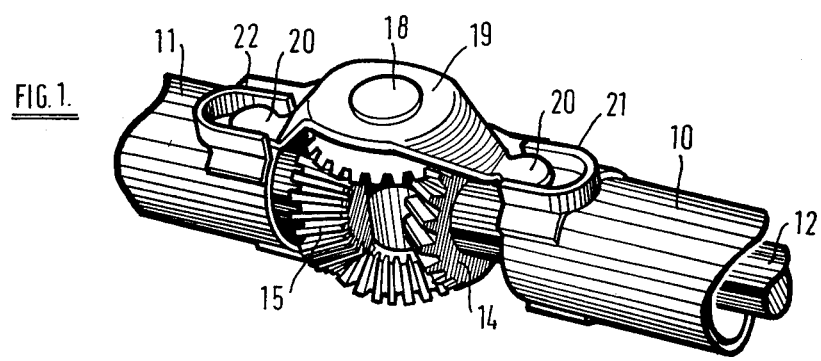
FIG. 1 is a perspective view of connecting means which may be used between, for example, a steering column and a steering box in a vehicle embodying the invention.
Figure 2:
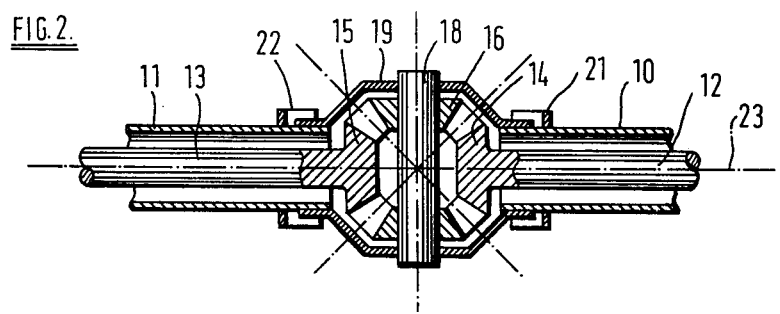
FIG. 2 is a section through the arrangement of FIG. 1.

Referring now to FIGS. 1 and 2 these will be used to describe the principle of the invention. There are outer members 10 and 11 and inner members 12 and 13, the member 12 being rotatable within the member 10 and the member 13 being rotatable within the member 11. The adjacent ends of the members 12 and 13 are formed with bevel side gears 14 and 15 respectively; the side gears mesh with planet gears 16 and 17 which are rotatable on a pin 18. The ends of the pin 18 are pivotally received in the bases of U-shaped links 19, the ends 20 of these links being rounded and being pivotally received in elongated guides 21 and 22 on the outer members 10 and 11 respectively.

If there is relative rotation between the outer members 10 and 11 the pin 18 will take up an average position between the two members. Thus if there is a relative rotation of, say, 10° between the members 10 and 11 the pin 18 will take up a position at 5° to each of the members 10 and 11. The pin will take up this position because it is supported midway between the outer members 10 and 11 in the links 19 which can, due to their rounded ends 20, pivot in the guides 21 and 22 as said relative rotation takes place. Because the pin 18 also carries the planet gears 16 and 17, the inner member 13 will have been moved and since the planet gears will have moved, in the foregoing example, through 5° about the axis 23, the side gear 15 will have turned through 10° about the axis 23 relative to the side gear 14. In the foregoing example, therefore, it follows that the outer member 11 will have turned 10° relative to the outer member 10 and the inner member 13 will have turned through 10° relative to the inner member 12 and the members 11 and 13 will be in the same relative position as they were before said relative rotation took place.

If, therefore, the member 10 is connected to the chassis of the vehicle and the member 12 to a steering wheel and if the member 11 is mounted on the axle of a vehicle and the member 13 arranged to steer the wheels of that vehicle, if the axle rotates relative to the chassis about the axis 23 the steering will not be disturbed because there will be no relative movement between the members 11 and 13.

If, however, there is relative rotation between the members 10 and 12 without there being relative rotation between the members 10 and 11, this will produce a relative rotation between the members 11 and 13 by the differential gearing and in the example above steering can be obtained. If there is relative rotation between the members 10 and 12 and between the members 10 and 11 then the relative rotation between the members 10 and 11 will not affect the relative rotation between the members 11 and 13 for foregoing reasons. This arrangement can be used to provide improved steering means for a vehicle as will be described below.

Figure 3:
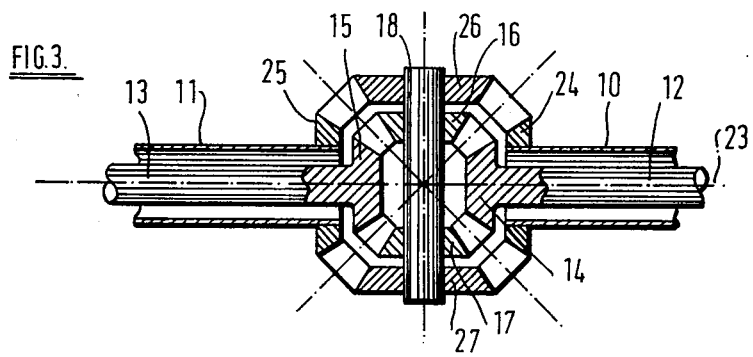
FIG. 3 is a section similar to FIG. 2 but showing a modified construction.

In FIG. 3, the links 19 with their guides 21 and 22 have been replaced by a second differential gearing. Parts in FIG. 3 which are identical to parts in FIGS. 1 and 2 have been given the same reference numerals.

In FIG. 3, the outer members 10 is provided with a side gear 24 and the outer members 13 is provided with a side gear 25. Planet gears 26 and 27 mesh with the side gears 24 and 25 and are also carried by the pin 18. The differential gearing provided by the gears 24–27 acts in precisely the same manner as the links 19 so that relative rotation between the members 10 and 11 will place the pin 18 in an average position due to the differential gearing and the inner differential gearing of the gears 14–17 will ensure that the member 13 does not turn relative to the member 11.

Figure 4:
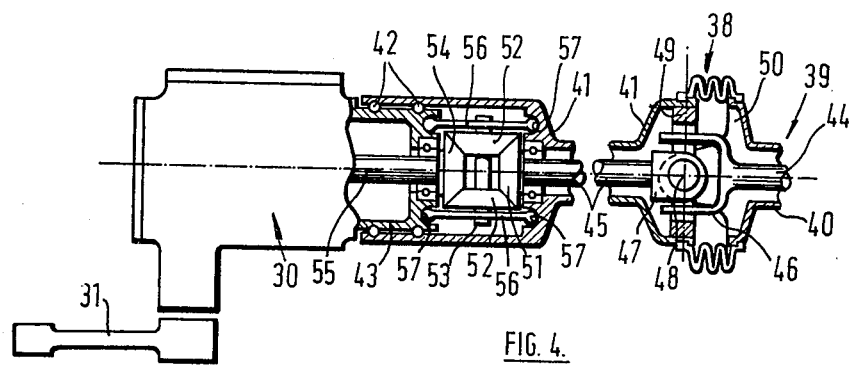
FIG. 4 is a view, partly in section, of a steering box and steering control means embodying the invention.
Figure 5:
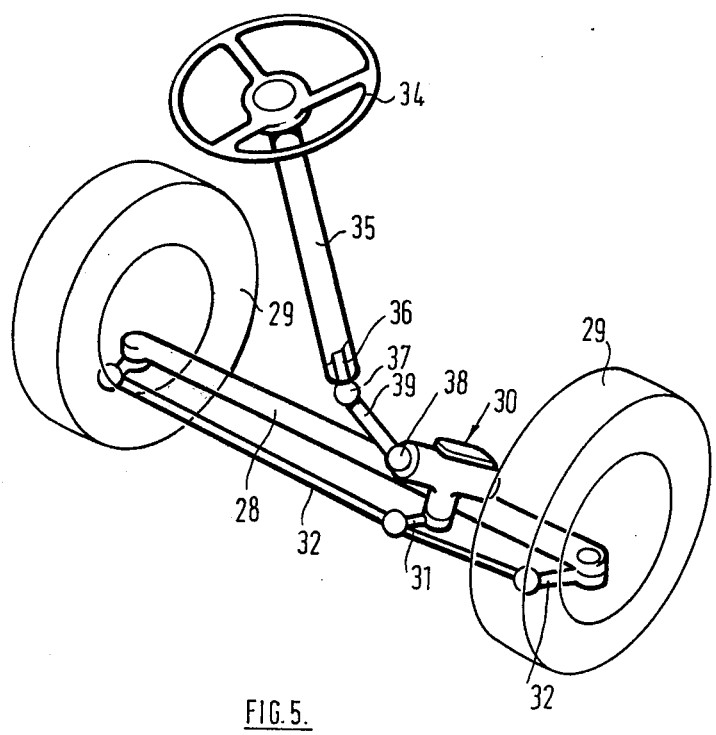
FIG. 5 is a perspective view of a steerable axle of a vehicle embodying the invention.

Referring now to FIGS. 4 and 5, a rigid axle for a vehicle is indicated at 28 and carries steerable wheels 29. A steering box 30 is mounted on the axle 28 and has an output 31 which is connected to a trackrod 32 which in turn is connected to steering arms for the wheels 29, one of said arms being indicated at 33. A steering wheel 34 is rotatably mounted on a steering column 35 which is connected to the chassis (not shown) of the vehicle. The steering wheel is connected to a shaft 36 rotatable within the column and the column and the shaft are connected through universal joints 37 and 38 and coaxial shafts 39 to the steering box 30 as will now be described.

Referring to FIG. 4, the universal joint 38 is a double universal joint between the outer shaft 40 of the coaxial shafts 39 and a bell shaped member 41 rotatably mounted on bearings 42 on a spigot 43 of the steering box 30. The universal joint 38 also connects the inner shaft 44 of the coaxial shafts 39 to a shaft 45 connected to the input of the steering box. Thus the shaft 44 has a yoke 46 at its end which is connected to a yoke 47 on the end of the shaft 45 by the usual cruciform member 48. The bell shaped member 41 is pivotally connected to a hoop 49 which is pivotally connected to ears 50 on the outer shaft 40. The pivotal axes between the member 41 and hoop 49 on the one hand and between the hoop 49 and the ears 50 on the other hand are perpendicular.

The input shaft 45 carries a bevel side gear 51 which meshes with planet gears 52 carried on a pin 53. The planet gears 52 mesh with a further side gear 54 connected to an input shaft 55 which is connected to a rack, not shown, within the steering box. A pinion, not shown, engages the rack and is connected to the steering box output 31. Links 56 engage the ends of the pin 53 and have their ends formed spherically and engaged in spherical recesses 57 in the bell shaped member 41 and the end of the spigot 43 of the steering box. The arrangement acts in the manner described in detail in relation to FIGS. 1 and 2. Thus if there is relative rotation between the member 41 and the spigot 43 the links 56 will take up an average position and the differential gearing will ensure that the input shaft 55 retains the same relative position relative to the housing as before the relative rotation.

The outer and inner shafts 40 and 44 of the coaxial shafts 49 are connected through a universal joint 37 similar to the joint 38 to the steering column 35 and the shaft 36 respectively. It follows from what has been said that if there is any rotation of the axle 28 relative to the column 35, this will not disturb the steering because of provision of the links 56 and the differential gearing. The universal joints 37 and 38 and the coaxial shafts 39 are merely a connection between the steering column 35 and the shaft 36 on the one hand and the steering box housing and the shaft 45 on the other so as to allow for relative movement between the chassis and the axle. When steering is required, relative rotation takes place between the column 35 and the shaft 36 thus causing relative rotation between the member 41 and the shaft 45 and thus producing relative rotation between the steering box housing and the shaft 55.

The arrangement above described with reference to FIGS. 4 and 5 thus applies the principle of FIGS. 1 and 2 to the vehicle, but the modification of FIG. 3, i.e. utilising a second differential gearing in place of the links 56, may be utilised in this and the following example.

Figure 6:
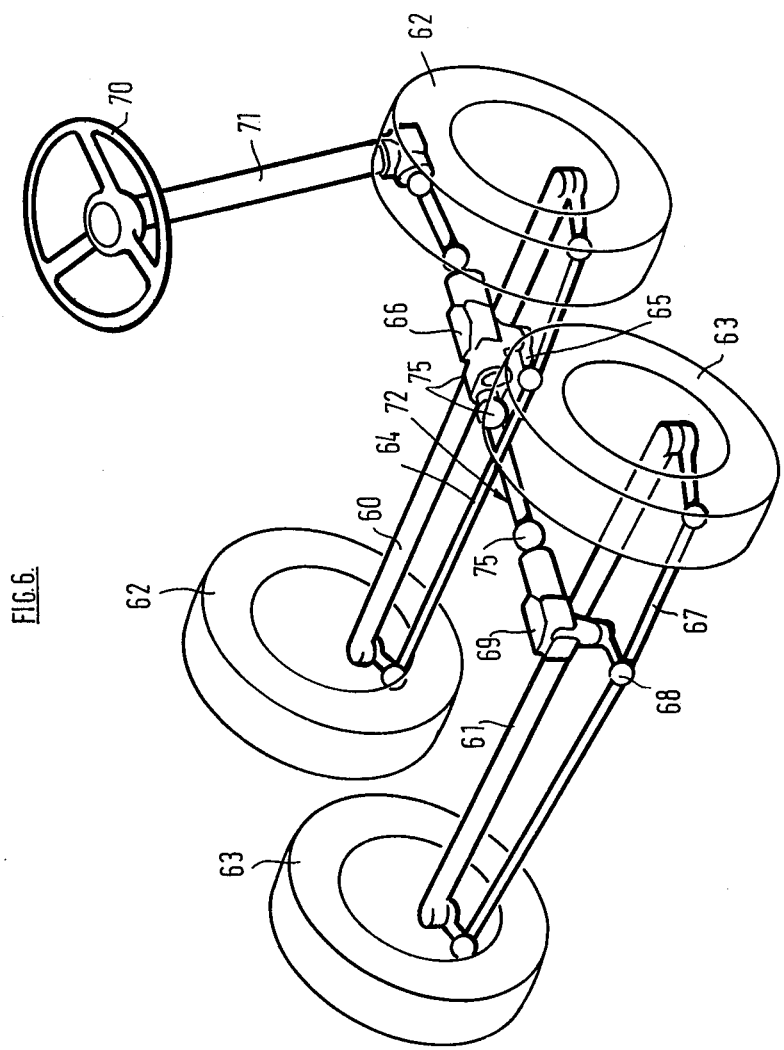
FIG. 6 is a perspective view similar to FIG. 5 but showing the steering arrangements of a vehicle embodying the invention and having two steerable axles.

FIGS. 6 and 7 shows an arrangement in which there are two steerable axles 60 and 61 carrying steerable wheels 62 and 63 respectively. The wheels 62 are connected by a track rod 64 to the output 65 of a first steering box 66 and the wheels 63 are connected by a track rod 67 to the output 68 of a second steering box 69. A steering wheel 70 and column 71 are connected to the steering box 66 in the manner described in relation to FIGS. 4 and 5. The steering box 66 is connected to the steering box 69 by means 72 shown in FIG. 7. This means 72 comprises coaxial shafts 73, 74 having at their ends universal joints 75 identical to the universal joint 38 described above. The housing of the steering box 66 is connected to the housing of the steering box 69 via the shaft 73 and the outer differential gearing of a double differential of the construction shown in FIG. 3. The input shaft 77 of the steering box 66 is connected to the input shaft of the steering box 69 via a gearing 78, the shaft 74 and the inner differential gearing of the differential 76. The gearing 78 is such that, during steering, there is a difference between the angle of rotation of the input shaft of the steering box 69 and the angle of rotation of the input shaft 77. This displacement is arranged so that the inclination of the wheels 63 relative to the wheels 62 is correct during steering of the vehicle around a corner.

Various modifications may be made to the invention. Thus the universal joints such as 37, 38, and 73 may be replaced by plunging universal joints having capacity for longitudinal displacement between their parts.

The bevel gear differential gearing described may be replaced by epicyclic differential gearing of the spur-gear type.

I claim:

1. A steerable vehicle comprising a rigid axle carrying steerable wheels; a steering box having a housing secured to the axle, an input rotatable relative to the housing and an output; means connecting said output to the steerable wheels; steering control means having first and second relatively rotatable parts; and means connecting the first part of the steering control means and said housing and having a first element arranged to take up an average position between said first part and the housing during relative rotation therebetween, and gearing means operatively connected between the second part of the steering control means and said input, said gearing means having a second element connected to said first element for simultaneous movement therewith and which takes up an average position between said second part and said input during relative rotation therebetween.

2. A vehicle according to claim 1 wherein said means connecting the first part of the steering control means and the housing is a second gearing means.

3. A vehicle according to claim 2 wherein said first and second gearing means are bevel differential gearing assemblies, having planet gears which constitute said first and second elements and are carried on a common shaft.

4. A vehicle according to claim 1 wherein the first element comprises links, pivotally connected to said first part and said housing, and the second element is carried between said links 5. A vehicle according to claim 1 wherein the first and second parts of the steering control means are arranged coaxially, with the second part within the first part.

6. A vehicle according to claim 5 wherein said parts each comprise a number of portions and there are provided universal joints connecting said portions, the universal joints between the inner portions being aligned with the universal joints between the outer portions.

7. A steerable vehicle comprising at least two rigid axles each carrying steerable wheels; steering control means having first and second relatively rotatable parts; a steering box for each axle, each steering box having a housing secured to the axle, an input rotatable relative to the housing and an output; and means connecting the output of each steering box to the steerable wheels of the axle on which said box is mounted; means connecting the first part of the steering control means and the housing of one of said steering boxes and having a first element arranged to take up an average position between the first part and the housing during relative rotation therebetween; a first gearing means operatively connected between the second part of the steering control means and the input of said one steering box and having a second element connected to said first element for simultaneous movement therewith and which takes up an average position between said second part and said input during said relative rotation therebetween; means connecting the housing of said one steering box and the housing of another of said steering boxes and having a third element arranged to take up an average position between said steering boxes during relative rotation therebetween; and a second gearing means operatively connected between the input of said one steering box and the input of said other steering box and having a fourth element connected to said third element for simultaneous movement therewith and which takes up an average position between said inputs during relative rotation therebetween.

* * * * *